United States Patent
Sobrenilla et al.

(10) Patent No.: US 12,028,482 B2
(45) Date of Patent: Jul. 2, 2024

(54) INITIATE "SEND INFORMATION VIA TEXT" BUTTON DURING A BRANDED CALL

(71) Applicant: T-Mobile Innovations LLC, Overland Park, KS (US)

(72) Inventors: Melodie Magdalene Sobrenilla, Sumner, WA (US); Derrick Lynn Ives, North Bend, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 301 days.

(21) Appl. No.: 17/522,490

(22) Filed: Nov. 9, 2021

(65) Prior Publication Data

US 2023/0147356 A1    May 11, 2023

(51) Int. Cl.

| | | |
|---|---|---|
| *H04M 3/493* | (2006.01) | |
| *H04M 3/42* | (2006.01) | |
| *H04W 4/12* | (2009.01) | |
| *H04W 4/16* | (2009.01) | |
| *H04W 4/23* | (2018.01) | |

(52) U.S. Cl.
CPC ....... *H04M 3/493* (2013.01); *H04M 3/42382* (2013.01); *H04W 4/12* (2013.01); *H04W 4/16* (2013.01); *H04W 4/23* (2018.02)

(58) Field of Classification Search
None
See application file for complete search history.

(56) References Cited

U.S. PATENT DOCUMENTS

| | | | |
|---|---|---|---|
| 8,130,937 B1 * | 3/2012 | Thenthiruperai ... | H04M 3/5175 379/266.02 |
| 2019/0378519 A1 * | 12/2019 | Dunjic ................ | G06F 21/606 |
| 2022/0182352 A1 * | 6/2022 | Torrey ................ | H04L 51/10 |
| 2022/0353672 A1 * | 11/2022 | Chau .................. | H04L 51/56 |

OTHER PUBLICATIONS

"Ignite Customer Engagement", Business Texting Software, Retrieved from Internet URL : https://www.textrequest.com/, accessed on Feb. 1, 2022, pp. 6.

Vogel, K., "8 best business text messaging services in 2021", Ring Central blog, Retrieved from Internet URL : https://web.archive.org/web/20211109170029/https://www.ringcentral.com/us/en/blog/business-text-messaging/, accessed on Feb. 1, 2022, pp. 12 (Jul. 2021).

* cited by examiner

*Primary Examiner* — Quynh H Nguyen
(74) *Attorney, Agent, or Firm* — SHOOK, HARDY & BACON L.L.P.

(57) ABSTRACT

Systems and methods for providing voice assisted data during a branded voice session via a telecommunication network include a provider device including an in-call dialer interface, a cell site, and message management circuitry communicatively coupled to a call center. The provider device is structured to receive an indication of an in-call message during a branded voice session, determine a call address responsive to receiving the indication of the in-call message, generate a message interface including the call address, receive, by the message interface, the voice assisted data, and based on the call address, provide the voice assisted data during the branded voice session.

20 Claims, 4 Drawing Sheets

INITIATE "SEND INFORMATION VIA TEXT" BUTTON DURING A BRANDED CALL

SUMMARY

The present disclosure is directed, in part, to providing voice assisted data during a branded voice session via a telecommunication network, substantially as shown in and/or described in connection with at least one of the figures, and as set forth more completely in the claims.

In aspects set forth herein, a provider device is connected to a telecommunication network. Typically, the provider device is connected, by the telecommunication network, to a call center that routes the call to an agent workstation. During the call, an agent may request information (e.g., an address, order number, etc.) that is communicated to the agent as the caller speaks into the provider device. Often times, the caller must repeat the information until the agent understands what the caller is saying. However, here, a provider device receives an indication of an in-call message during a branded voice session (e.g., a branded call) and provides voice assisted data (e.g., information such as, but not limited to, the address, order number, etc.) during the branded voice session to a receiver device correlated to a call center which increases the accurate transfer of such information during a branded voice session.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, methods are provided for providing voice assisted data during a branded voice session via a telecommunication network. An indication of an in-call message is received during a branded voice session. A call address is determined responsive to receiving the indication of the in-call message. The call address identifies a receiver device to receive voice assisted data. A message interface including the call address is generated. The voice assisted data is received. The voice assisted data is provided, based on the call address, during the branded voice session to the receiver device.

Advantageously, providing voice assisted data during a branded voice session increases the efficient provision of information while facilitating the accurate transfer of such information.

In one aspect, a method is provided for providing voice assisted data during a branded voice session via a telecommunication network. The method includes receiving, via a provider device including an in-call dialer interface and a message initiator, an indication of an in-call message during a branded voice session. The method also includes determining a call address responsive to receiving the indication of the in-call message, the call address identifying a receiver device to receive voice assisted data. The receiver device is communicatively coupled to session management circuitry of a call center. The method further includes generating a message interface including the call address. The method further includes receiving, by the message interface, the voice assisted data. The method further includes, based on the call address, providing, by the provider device, the voice assisted data during the branded voice session.

In another aspect, a computer-readable storage media having computer-executable instructions embodied thereon is provided that, when executed by one or more processors, cause the processors to perform various steps. The processors are caused to receive, via a provider device including an in-call dialer interface and a message initiator, an indication of an in-call message during a branded voice session. The processors are also caused to determine a call address responsive to receiving the indication of the in-call message, the call address identifying a receiver device to receive voice assisted data. The receiver device is communicatively coupled to session management circuitry of a call center. The processors are further caused to generate a message interface including the call address. The processors are further caused to receive, by the message interface, the voice assisted data. The processors are further caused to, based on the call address, provide the voice assisted data during the branded voice session.

In yet another aspect, a system is provided for providing voice assisted data during a branded voice session via a telecommunication network. The system includes a provider device including an in-call dialer interface, a cell site, and message management circuitry communicatively coupled to the cell site and a call center. The provider device receives, via the in-call dialer interface including a text button, an indication of an in-call message during a branded voice session. The provider device also determines a call address responsive to receiving the indication of the in-call message, the call address to identify a receiver device to receive voice assisted data. The receiver device is communicatively coupled to session management circuitry. The provider device further generates a message interface including the call address. The provider device further receives, by the message interface, the voice assisted data. The provider device further provides, based on the call address, the voice assisted data during the branded voice session.

Throughout this disclosure, several acronyms and shorthand notations are used to aid the understanding of certain concepts pertaining to the associated system and methods. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 400 shown in FIG. 4. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

The terms "user equipment," "UE," "provider device," "receiver device," and "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, the UE may take on any variety of devices, such as a personal computer, laptop computer, tablet, netbook, mobile phone, smart phone, personal digital assistant, wearable device, augmented reality device, fitness tracker, or any other device capable of communicating using one or more resources of the network. The UE may include components such as software and hardware, a processor, a memory, a display component, a power supply or power source, a speaker, a touch-input component, a keyboard, and the like. In embodiments, some of the UE discussed herein may include current UE capable of using 5G or 6G and having backward compatibility with prior access technologies, current UE capable of using 5G or 6G and lacking backward compatibility with prior access technologies, and legacy UE that is not capable of using 5G or 6G.

A "network" refers to a network comprised of wireless and wired components that provide wireless communications service coverage to one or more UE. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (i.e., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discus sed hereinafter.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1:
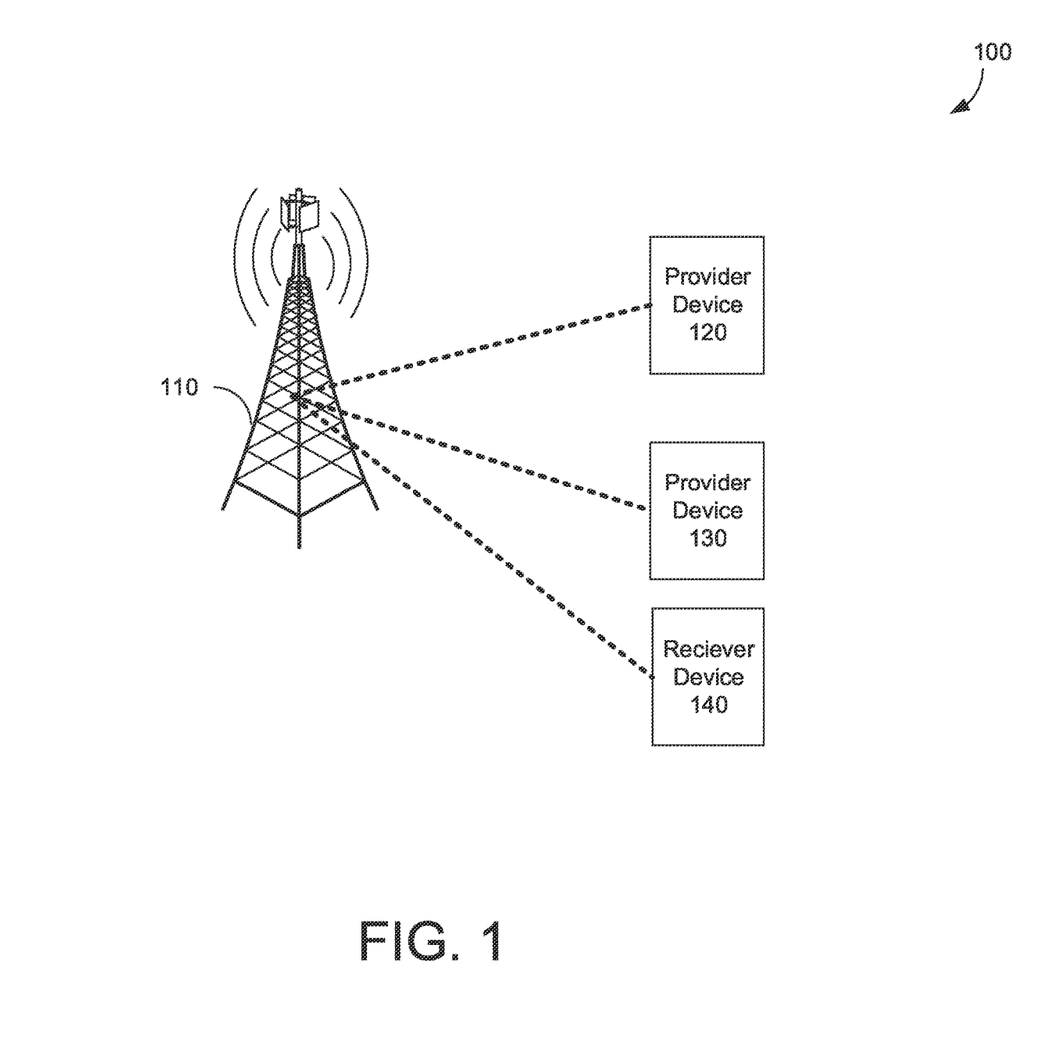
FIG. 1 depicts an example of a network environment in accordance with one or more embodiments.

FIG. 1 illustrates an example of a network environment 100 suitable for use in implementing embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 120, 130, and 140. In some embodiments, the network environment 100 may include a telecom network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. Those devices and components may provide connectivity in a variety of implementations. In addition the network environment 100 may be utilized in a variety of manners, such as a single network, multiple networks, or as a network of networks, but, ultimately, is shown as simplified as possible to avoid the risk of confusing other aspects of the present disclosure.

The telecom network included in the network environment 100 may include or otherwise may be accessible through a cell site (e.g., the cell site 110). The cell site may include one or more antennas, base transmitter stations, radios, transmitter/receivers, digital signal processors, control electronics, GPS equipment, power cabinets or power supply, base stations, charging stations, etc. such that the cell site may provide a communication link between one or more user devices (e.g., one or more provider devices and/or receiver devices such as the user devices 120, 130, and 140) and other components, systems, equipment, and/or devices of the network environment 100. The base station and/or a computing device (e.g., whether local or remote) associated with the base station may manage or otherwise control the operations of components of the cell site.

In some embodiments, the cell site may be operable in a non-stand alone (NSA) mode. In the non-stand alone mode the network environment 100 may take the form of, for example, an E-UTRAN New Radio-Dual Connectivity (EN-DC) network. In an EN-DC network, a provider device and/or a receiver device may connect to or otherwise access a 4G, LTE, 5G, or any other suitable network simultaneously. In the stand alone mode, the telecom network may take the form of a 5G, 6G, or any other suitable network.

In some embodiments, the network environment 100 may include one or more nodes communicatively coupled to one or more provider devices (e.g., the provider devices 120 and 130) and one or more receiver devices (e.g., the receiver device 140) such that the node(s) may transmit to and receive requests and/or data from the provider device(s) and/or the receiver device(s). The one or more nodes may include a Next Generation Node B (e.g., gNodeB or gNB) or any other suitable node. The one or more nodes may correspond to one or more frequency bands within which the provider device(s) and/or the receiver device(s) may connect to the network environment such as, but not limited to, a telecommunication network or a portion thereof.

In some embodiments, the node(s) may be included within the cell site (e.g., the cell site 110), external to the cell site, or otherwise communicatively coupled to the cell site. The node(s) may allocate radio frequency, or a portion thereof, to user device(s).

In some embodiments, the provider device(s) and/or the receiver device(s) may take the form of a wireless or mobile device capable of communication via the network environment 100. For example, the provider device 120 may take the form of a mobile device capable of communication via a telecom network such as, but not limited to, a wireless telecommunication network. In this regard, the provider device(s) and/or the receiver device(s) may be any computing device that communicates by way of a network, for example, a 4G, LTE, WiMAX, Wi-Fi, 5G, 6G, or any other type of network.

In some embodiments, the network environment 100 may connect subscribers (e.g., current subscribers and/or potential subscribers) to a service provider or a plurality of service providers. Alternatively or additionally, the network environment 100 may be associated with a specific telecommunication provider or a plurality of telecommunication providers that provide services (e.g. 5G, 6G, voice, location, data, etc.) to one or more user devices. For example, the provider devices 120 and 130 and/or the receiver device 140 may be subscribers to a telecommunication service provider, in which the devices are registered or subscribed to receive voice and data services (e.g., receive content that may be streamed, downloaded, etc.) over the network environment 100. The network environment 100 may include any communication network providing voice and/or data service(s), such as, for example, a Wi-Fi network, 4G network (LTE, WiMAX, HSDPA), 5G network, or 6G network.

Having described the network environment 100 and components operating therein, it will be understood by those of ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by those of ordinary skill in the art that the number, interactions, and physical location of components illustrated in FIG. 1 are examples, as other methods, hardware, software, components, and devices for establishing one or more communication links between the various components may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
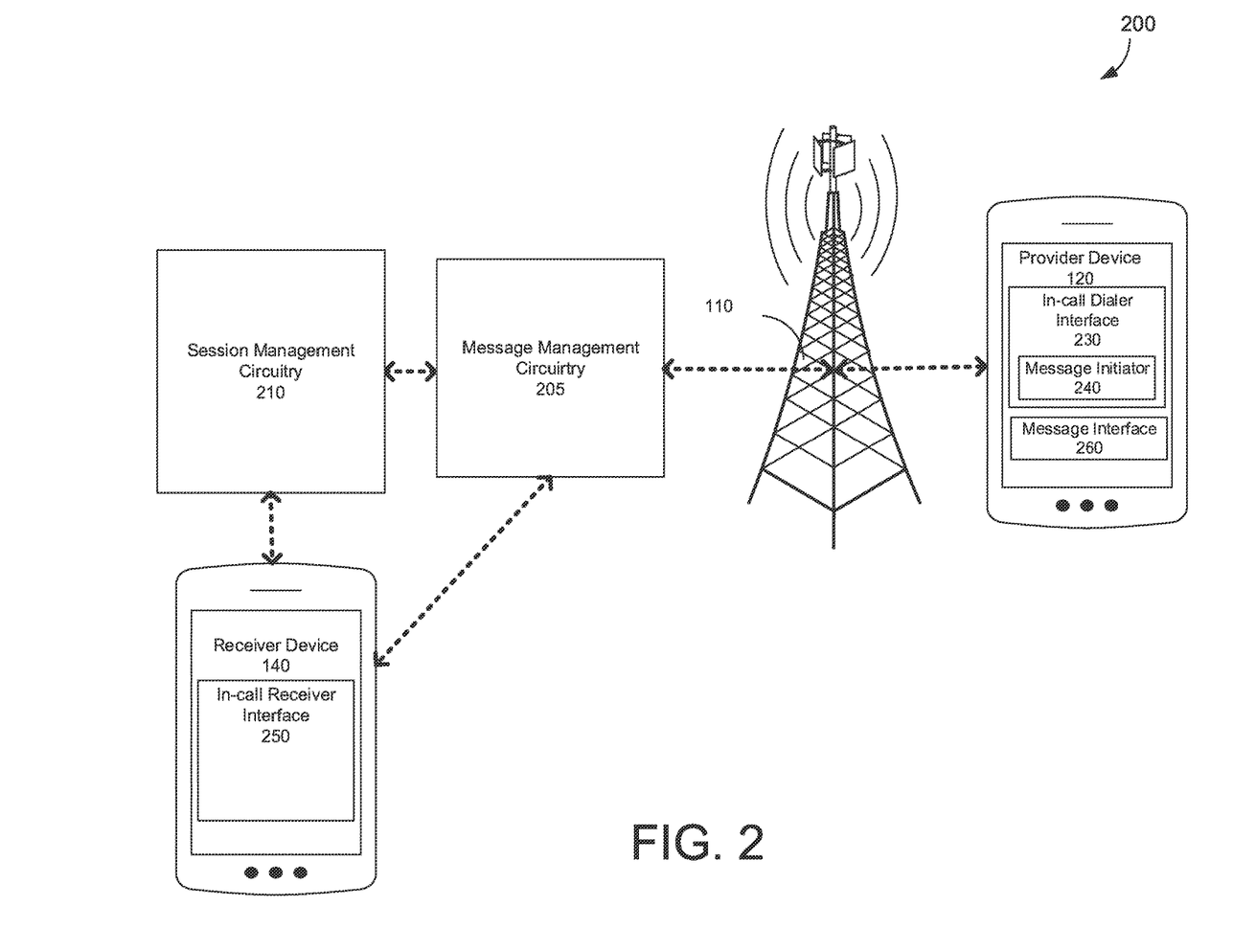
FIG. 2 is a diagram of a network environment including message management circuitry in accordance with an example embodiment.

FIG. 2 is a diagram of the network environment 200 (e.g., a telecommunication environment such as, but not limited to, a wireless telecommunication environment) according to an example embodiment. In the present embodiment, the network environment 200 includes the cell site 110, message management circuitry 205, session management circuitry 210, provider device 120, and receiver device 140. Although some of the components in the network environment 200 are depicted as single components (e.g., a single provider device, message management circuitry, cell site, etc.), in some embodiments, the network environment 200 may include a plurality of such components.

In some embodiments, the provider device (e.g., the provider device 120) may receive an indication of an in-call message during a branded voice session. The provider device may include an in-call dialer interface (e.g., the in-call dialer interface 230). The in-call dialer interface may, in some examples, include one or more in-call options. For example, the in-call dialer interface may include a keypad, call menu, and/or any other feature that may be utilized during a branded voice session. In some embodiments, the in-call dialer interface may include a message initiator (e.g., the message initiator 240). As used herein, the term "message initiator" may be used to refer to a text button, message box, chat box, and/or any component that initiates the receipt of input. For example, the message initiator (e.g., a text button) may initiate the receipt of voice assisted data (e.g., a message) as described herein. A user of a provider device may select, press, tap and/or provide a voice command that awakens (e.g., activates) the message initiator during a branded voice session to initiate the receipt of voice assisted data. Providing a user with a message initiator allows the user to provide voice assisted data without repeating information during a branded voice session.

In some embodiments, the provider device may determine a call address. The call address may include one or more numeric characters and/or alphabet characters. For example, the call address may include at least one of a phone number or an extension. The call address may identify a device (e.g., a receiver device, provider device, etc.) to receive at least one of voice assisted data or a voice assisted data alert. As used herein, the term "voice assisted data" may refer to data or information that may be received during a branded voice session. The voice assisted data may include one or characters (e.g., numeric characters/alphabet characters). In some examples, the voice assisted data may include an email address, phone number, address, order number, tracking number, name, social security number, date of birth, pin number, security code, and/or any other data provided during a branded voice session. In some embodiments, the voice assisted data may take the form of one or more messages that include an email address, phone number, address, name, social security number, date of birth, pin number, security code, and/or any other data provided during a branded voice session. The voice assisted data may be operable or otherwise based on a short message service (SMS), multi-media service (MMS), or any other message service.

In some examples, the provider device may determine the call address responsive to receiving the indication of the in-call message. In some embodiments, the provider device may include circuitry that looks up, via one or more databases, the call address.

The provider device (e.g., the provider device 120) may generate a message interface (e.g., the message interface 260). The message interface generated may include the call address and/or any other identifier associated with the device (e.g., the receiver device 140) to receive the voice assisted data. The message interface may include a message initiator.

For example, the message interface may include the message initiator such as, but not limited to, a message box, chat box, or a combination thereof.

The provider device may receive, via the message interface, the voice assisted data during the branded voice session. In this regard, the message interface may receive, via a message box, one or characters (e.g., numeric characters/alphabet characters) during the branded voice session. For example, the message interface 260 may receive voice assisted data such as, but not limited to, one or more numeric characters/alphabet characters that form a name, order number, address, etc. during the branded voice session.

The provider device may provide the voice assisted data during the branded voice session. The voice assisted data may be provided, based on the call address, to a message management circuitry 205. For example, the voice assisted data (e.g., the message that includes a name, address, and/or order number) may be transmitted or otherwise received by the message management circuitry 205. The voice assisted data may be provided, in some examples by the message management circuitry 205, to the session management circuitry 210 communicatively coupled to one or more receiver device(s). In some embodiments, the session management circuitry 210 may be included within a call center system(s), external to the call center system(s), or otherwise communicatively coupled to call center system(s).

In some embodiments, the message management circuitry 205 may provide (e.g., may transmit, forward, route, etc.) the voice assisted data to the receiver device communicatively coupled to the session management circuitry 210. If the receiver device is in an inactive state (e.g., powered off), the message management circuitry 205 may store the voice assisted data. In further embodiments, if the receiver device moves from the inactive state to an active state (e.g., powered on), the message management circuitry 205 may provide the voice assisted data to the receiver device communicatively coupled to the session management circuitry 210. In some embodiments, the session management circuitry may include one or more user interfaces (e.g., message interfaces that may receive, output, display, and/or provide voice assisted data). The user interfaces may be communicatively coupled to and/or operable via one or more APIs. The APIs may provide or otherwise transmit the voice assisted data between the user interface(s) and/or the message management circuitry 205. Alternatively or additionally, the user interface(s) may receive the call address (e.g., phone number) of the provider device during the branded voice session. In some examples, the branded voice session may be initiated by the transmission of an invitation to join the branded voice session to the message management circuitry 205. The management circuitry 205 may provide or otherwise transmit the invitation to join the branded voice session to the provider device. The provider device may accept the invitation to join the branded voice session by receiving an indication of an in-call message as described herein.

Such voice assisted data may be output by an in-call receiver interface (e.g., the in-call receiver interface 250) of the receiver device (e.g., the receiver device 140 such as, but not limited to, a laptop, desktop, mobile device, wearable, wireless device, etc.), mobile application, call center application, dashboard, and/or any other suitable output device, system, and/or component. Advantageously, providing voice assisted data during a branded voice session via a telecommunication network increases the efficient provision of data/information while facilitating the accurate transfer of such data/information during a branded voice session.

In some embodiments, the receiver device may generate a voice assisted data alert. The voice assisted data alert may be generated in response to the voice assisted data received. The voice assisted data alert may verify whether the voice assisted data has been received. Alternatively or additionally the voice assisted data alert may request additional voice assisted data.

The receiver device may determine the call address of the provider device. The call address of the provider device may identify the provider device to receive the voice assisted data alert. The voice assisted data alert may be provided by the receiver device 140 to the session management circuitry 210. The session management circuitry 210 may provide or otherwise transmit the voice assisted data alert to the message management circuitry 205. In turn, the message management circuitry 205 may provide the voice assisted data alert to the provider device 120. The voice assisted data alert may be output or otherwise displayed by the message interface of the provider device 120.

Figure 3:
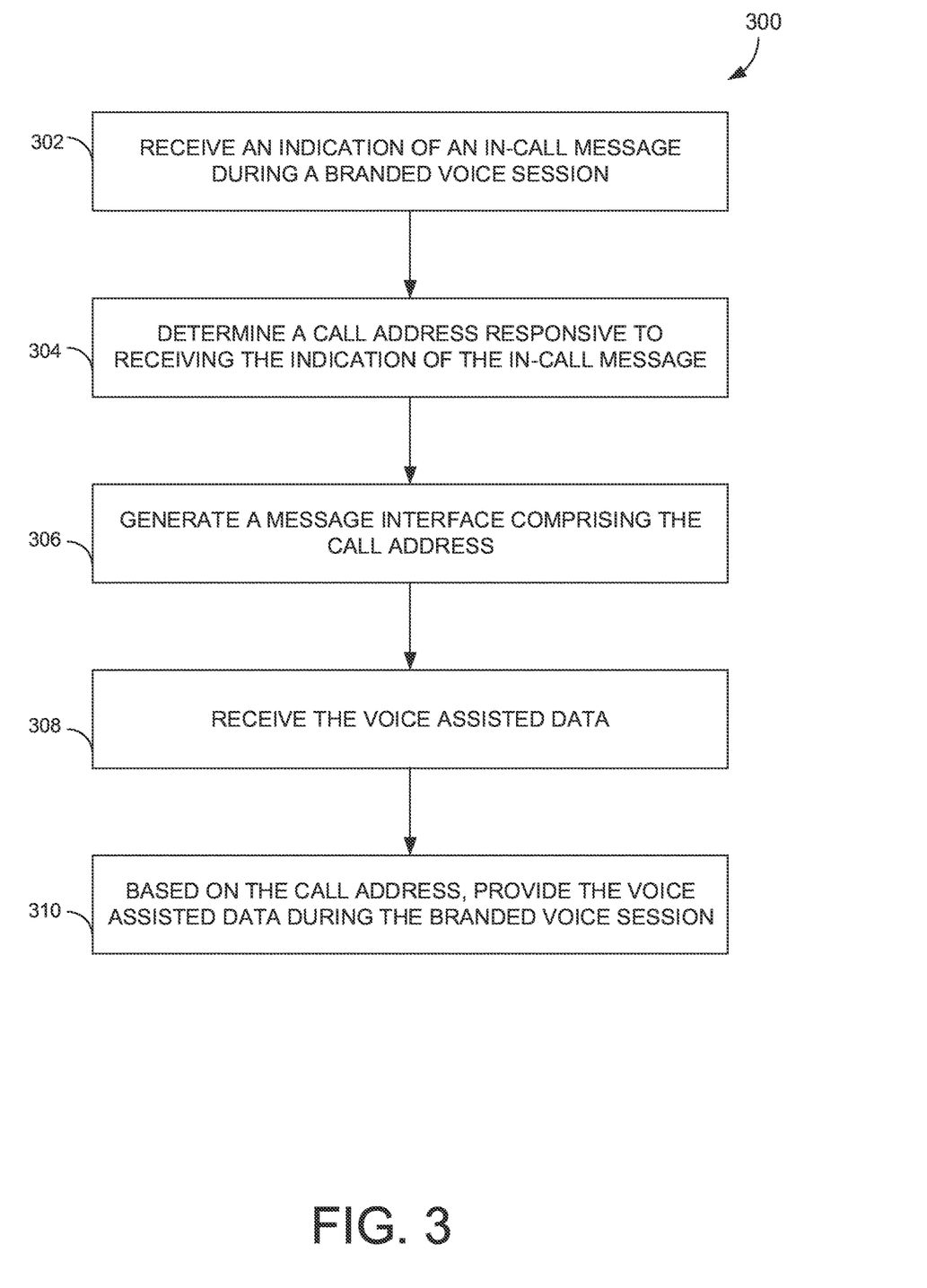
FIG. 3 depicts a flowchart of an exemplary method for providing voice assisted data during a branded voice session via a telecommunication network in accordance with an example embodiment.

FIG. 3 depicts a flow diagram of an exemplary method 300 for providing voice assisted data during a branded voice session via a telecommunication network, in accordance with implementations of the present disclosure. Initially at block 302 an indication of an in-call message is received by the provider device during a branded voice session. The provider device may include an in-call dialer interface. The in-call dialer interface may, in some examples, include one or more in-call options (e.g., a keypad, call menu, message initiator, etc.). The indication of an in-call message provided by the message initiator, such as a text button, may initiate the receipt of voice assisted data.

At block 304, a call address is determined responsive to receiving the indication of the in-call message. The call address (e.g., one or more characters and/or digits) may identify a device (e.g., a receiver device, provider device, etc.) to receive voice assisted data. The voice assisted data may include an email address, tracking number, and/or any other data provided during a branded voice session. In some embodiments, the voice assisted data may take the form of message that includes the email address and/or tracking number. The message may be operable according to a short message service.

In some embodiments, a message interface is generated at block 306. The message interface generated may include the call address and/or any other identifier associated with the device to receive the voice assisted data. At block 308, the voice assisted data is received during the branded voice session. In some examples, a message box included in the message interface may receive one or characters that form the email address, tracking number, etc. during the branded voice session.

At block 310, the voice assisted data is provided during the branded voice session. The voice assisted data (e.g., the message that includes the email address, tracking number, etc.) may be provided (e.g., transmitted), based on the call address, to a message management circuitry. In some examples, the voice assisted data may be provided, by the message management circuitry, to the session management circuitry communicatively coupled to one or more receiver device(s). Alternatively or additionally, the message management circuitry may provide the voice assisted data to the receiver device communicatively coupled to the session management circuitry. The voice assisted data may be output (e.g., displayed) by an in-call receiver interface of the receiver device (e.g., a laptop), call center application, dashboard, and/or any other suitable output device, system, and/or component.

Figure 4:
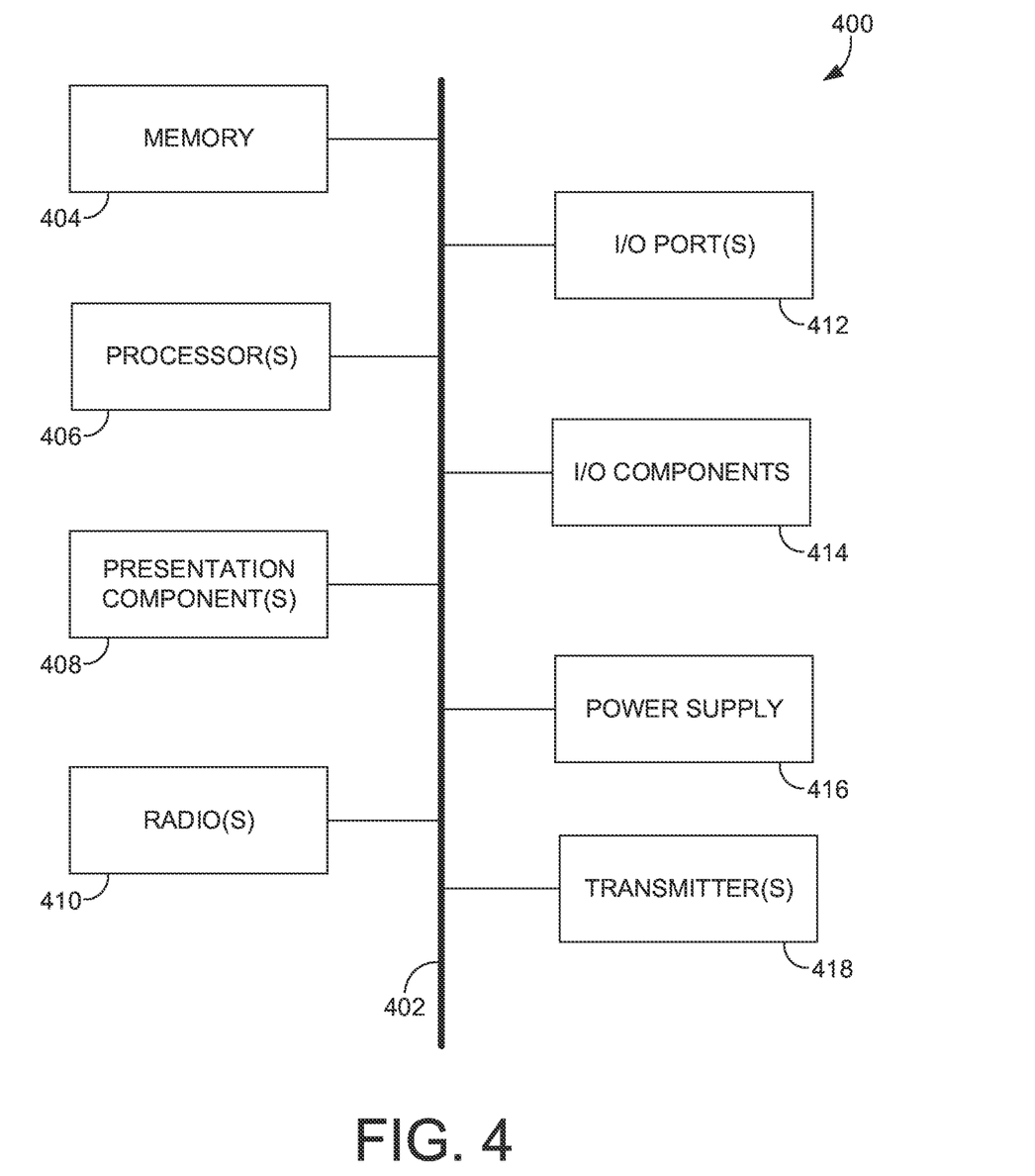
FIG. 4 depicts an exemplary computing device suitable for use in implementations of aspects herein.

Referring to FIG. 4, a block diagram of an example of a computing device 400 suitable for use in implementations of the technology described herein is provided. In particular, the exemplary computer environment is shown and designated generally as computing device 400. Computing device 400 is but one example of a suitable computing environment and is not intended to suggest any limitation as to the scope of use or functionality of the invention. Neither should computing device 400 be interpreted as having any dependency or requirement relating to any one or combination of components illustrated. In aspects, the computing device 400 may be a base station. In another embodiment, the computing device 400 may be UE capable of two-way wireless communications with an access point. Some non-limiting examples of the computing device 400 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 4, computing device 400 includes a bus 402 that directly or indirectly couples various components together. The bus 402 may directly or indirectly one or more of memory 404, processor(s) 406, presentation component(s) 408 (if applicable), radio(s) 410, input/output (I/O) port(s) 412, input/output (I/O) component(s) 414, power supply 416, and/or transmitter(s) 418. Although the components of FIG. 4 are shown with lines for the sake of clarity, in reality, delineating various components is not so clear, and metaphorically, the lines would more accurately be grey and fuzzy. For example, one may consider a presentation component(s) 408 such as a display device to be one of I/O components 414. Also, the processor(s) 406 may include memory 404, in another example. The present disclosure hereof recognizes that such is the nature of the art, and reiterates that FIG. 4 is merely illustrative of an example of a computing device 400 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 404 may take the form of memory components described herein. Thus, further elaboration will not be provided here, but it should be noted that memory 404 may include any type of tangible medium that is capable of storing information, such as a database or data store. A database or data store may be any collection of records, files, or information encoded as electronic data and stored in memory 404, for example. In one embodiment, memory 404 may include a set of embodied computer-readable and executable instructions that, when executed, facilitate various functions or elements disclosed herein. These embodied instructions will variously be referred to as "instructions" or an "application" for short.

Processor(s) 406 may be multiple processors that receive instructions and process them accordingly. Presentation component(s) 408, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 410 represents one or more radios that facilitate communication with a wireless telecommunication network. For example, radio(s) 410 may be connected to one or more antenna elements through a physical path. Illustrative wireless telecommunications technologies include CDMA, GPRS, TDMA, GSM, and the like. Radio(s) 410 might additionally or alternatively facilitate other types of wireless communications including Wi-Fi, WiMAX, 3G, 4G, LTE, mMIMO, 5G, 6G, NR, VoLTE, and/or other VoIP communications. As can be appreciated, in various embodiments, radio(s) 410 may be configured to concurrently support multiple technologies, as previously discussed herein. As such, each of many radio(s) 410 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 412 may take a variety of forms. Exemplary I/O ports 412 may include a USB jack, a stereo jack, an infrared port, a firewire port, other proprietary communications ports, and the like. Input/output (I/O) components 414 may comprise keyboards, microphones, speakers, touchscreens, and/or any other item usable to directly or indirectly input data into the computing device 400.

Power supply 416 may include batteries, fuel cells, and/or any other component that may act as a power source to supply power to the computing device 400 or to other network components, including through one or more electrical connections or couplings. Power supply 416 may be configured to selectively supply power to different components independently and/or concurrently.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and sub-combinations are of utility and may be employed without reference to other features and sub-combinations and are contemplated within the scope of the claims.

The invention claimed is:

1. A method for providing voice assisted data during a branded voice session via a telecommunication network, the method comprising:

receiving, via a provider device employed by an end-user caller comprising an in-call dialer interface and a message initiator, an indication of an in-call message during a branded voice session;

determining a call address responsive to receiving the indication of the in-call message, the call address identifying a receiver device to receive voice assisted data, wherein the receiver device is communicatively coupled to session management circuitry of a call center;

generating, at the provider device, a message interface comprising the call address;

receiving, by the message interface, the voice assisted data provided by the end-user caller; and based on the call address, providing, by the provider device, the voice assisted data during the branded voice session to the receiver device.

2. The method of claim 1, wherein the in-call dialer interface comprises a keypad.

3. The method of claim 1, wherein the in-call dialer interface comprises one or more in-call options.

4. The method of claim 1, wherein the voice assisted data comprises at least one of an email address, phone number, address, or name.

5. The method of claim 1, wherein the call address comprises at least one of a phone number or extension.

6. The method of claim 1, wherein the message initiator comprises at least one of a text button or message box.

7. The method of claim 1, further comprising looking up the call address.

8. The method of claim 1, wherein the provider device is structured to provide the voice assisted data to message management circuitry.

9. The method of claim 8, wherein at least one of the provider device or the receiver device is communicatively coupled to at least one of a 4G network, E-UTRAN New Radio-Dual Connectivity (EN-DC) network, 5G network, 6G network, or Wi-Fi network.

10. Computer-readable storage media having non-transitory computer-executable instructions embodied thereon that, when executed by one or more processors, cause the one or more processors to:

receive, via a provider device employed by an end-user caller comprising an in-call dialer interface and a message initiator, an indication of an in-call message during a branded voice session;

determine a call address responsive to receiving the indication of the in-call message, the call address identifying a receiver device to receive voice assisted data, wherein the receiver device is communicatively coupled to session management circuitry;

generate, at the provider device, a message interface comprising the call address;

receive, by the message interface, the voice assisted data provided by the end-user caller; and based on the call address, provide by the provider device, the voice assisted data during the branded voice session to the receiver device.

11. The computer-readable storage media of claim 10, wherein the message initiator comprises at least one of a text button or message box.

12. The computer-readable storage media of claim 10, wherein the in-call dialer interface comprises one or more in-call options.

13. The computer-readable storage media of claim 10, wherein the voice assisted data comprises at least one of an email address, order number, tracking number, address, or name.

14. The computer-readable storage media of claim 10, wherein the call address comprises at least one of a numeric character or alphabet character.

15. The computer-readable storage media of claim 10, wherein the provider device is structured to provide the voice assisted data to message management circuitry.

16. A system for providing voice assisted data during a branded voice session via a telecommunication network, the system comprising:

a provider device employed by an end-user caller comprising an in-call dialer interface;

a cell site; and message management circuitry communicatively coupled to the cell site and a call center, the provider device structured to:

receive, via the in-call dialer interface comprising a text button, an indication of an in-call message during a branded voice session;

determine a call address responsive to receiving the indication of the in-call message, the call address to identify a receiver device to receive voice assisted data, wherein the receiver device is communicatively coupled to session management circuitry;

generate, at the provider device, a message interface comprising the call address responsive;

receive, by the message interface, the voice assisted data provided by the end-user caller; and based on the call address, provide the voice assisted data during the branded voice session to the receiver device.

17. The system of claim 16, wherein the message management circuitry is communicatively coupled to session management circuitry.

18. The system of claim 16, wherein the receiver device comprises an in-call receiver interface, and wherein the in-call receiver interface comprises the voice assisted data.

19. The system of claim 16, wherein the receiver device is structured to generate a voice assisted data alert in response to the voice assisted data received, the voice alert requesting additional voice assisted data to be provided by the end-user caller.

20. The system of claim 16, wherein the provider device comprises a message interface, and wherein the message interface comprises a message box.

* * * * *